Aug. 31, 1937.   P. T. FARNSWORTH   2,091,705
PROJECTION APPARATUS
Filed Nov. 6, 1934
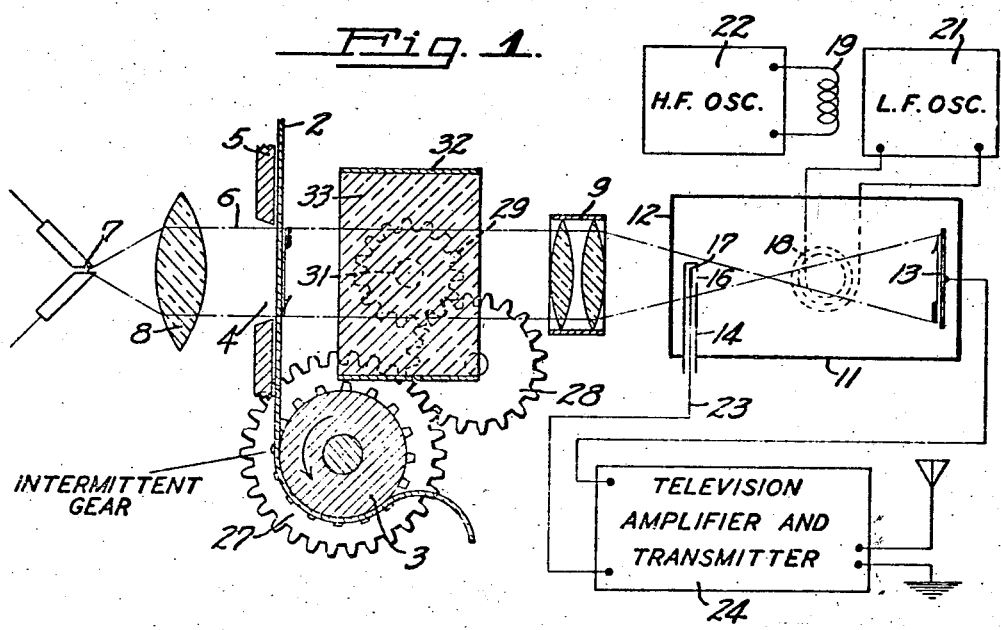
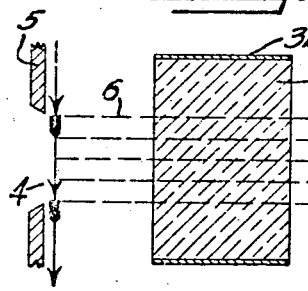
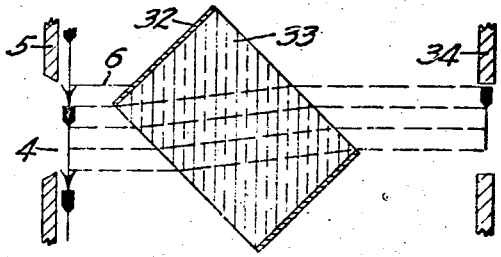
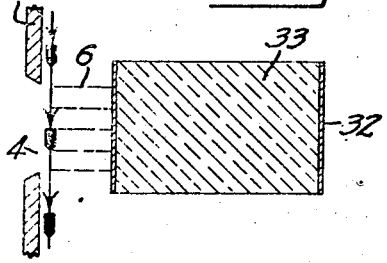
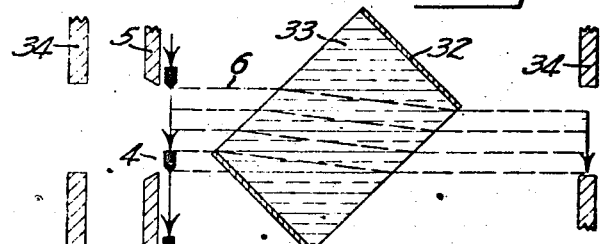
INVENTOR.
PHILO T. FARNSWORTH.
BY Lippincott + Metcalf
ATTORNEYS.

Patented Aug. 31, 1937

2,091,705

UNITED STATES PATENT OFFICE 2,091,705

PROJECTION APPARATUS

Philo T. Farnsworth, San Francisco, Calif., assignor to Farnsworth Television Incorporated, a corporation of California Application November 6, 1934, Serial No. 751,716

15 Claims. (Cl. 178—6)

My invention relates to apparatus for the projection of motion pictures, and particularly to such apparatus adapted to be used in conjunction with a television transmitter.

Among the objects of my invention are: to provide, in motion picture projection, apparatus for use in conjunction with a television transmitter wherein successive picture frames of the film are intermittently moved through a beam of light and positioned before scanning means, a shutter which permits a longer interval of exposure of picture areas between periods when the light beam is cut off to permit shifting of the film; to provide a shutter which, when operated with a projector having a moderate speed film shifting mechanism, produces the effect of a high speed mechanism, by shortening the cut-off period between successive exposures of the film; to provide a shutter for use in apparatus for the transmission of television motion pictures which permits, during each scansion, an increase in the number of picture elements and consequently produces an image having finer detail; to provide a shutter for the use above described, which, in a cathode ray image dissector tube, by lengthening the interval of exposure of each picture frame, permits slower movement of the scanning beam over the area to be scanned and consequently the signal output from such a tube is materially increased due to the additional energy collected during each scansion; to provide, in apparatus of the character described, projection means for a motion picture film, which, while operable to project a series of images considerably in excess of the frequency necessary to maintain persistency of vision, will produce intervals of exposure of each image equivalent to that obtainable with such a frequency without introducing the objectionable flicker identified therewith; to provide the combination, in television apparatus having means for scanning, insuccessive elemental areas, an illuminated optical image projected from a motion picture film, of means for permitting full exposure of that elemental area of the image being scanned, for gradually increasing to full exposure those elemental areas of the image to be scanned, in advanced of the scanned area, and for decreasing the exposure of those areas already scanned; to provide a simple and easily constructed shutter, and one which may be constructed from readily procurable materials; to provide a shutter which maintains portions of a projected image in stationary relationship to a screen even though the film from which the image is projected is moving; to provide means for refracting a beam of light projected from a source to a screen through means for defining the cross sectional shape of the beam, so that portions of the defined area of the beam projected on the screen will remain stationary when the beam-defining means is moved transverse to the axis of the beam; to provide an improved shutter which may readily be incorporated in existing projectors for television use; and to provide improved apparatus for the transmission of televised motion pictures.

Other objects of my invention will be apparent or will be specifically pointed out in the description forming a part of this specification, but I do not limit myself to the embodiment of the invention herein described, as various forms may be adopted within the scope of the claims.

Referring to the drawing:

Figure 1 is an elevational view, mostly diagrammatic in character and reduced to lowest terms, of a television transmission system incorporating the improved projection apparatus of my invention.

Figures 2 to 5 inclusive are diagrammatic views illustrating the means for refracting the projected light beam in different stages of arrangement.

Stated broadly, my invention comprises the combination, with apparatus for projecting in rapid sequence, a series of superposed optical images on a surface from a motion picture film, or other means for defining the image, including means for intermittently moving elemental portions of said film or image-defining means into registry with a beam of light emanating from a light source and projected on said surface, and allowing said elemental portions to dwell for intervals in said beam, and a shutter for intersecting said beam at other intervals to obstruct passage of portions of the beam to the surface during movement of the film; of means operating in conjunction with said shutter for refracting portions of the beam so that portions of the area illuminated by the beam on the surface will remain in stationary relationship thereto during a portion of the movement of the film or beam-defining means.

At the present time extensive research work is being carried on in the field of the transmission of motion pictures by television. Heretofore, it has been the practice to utilize a standard motion picture projector for reproducing a series of optical images from the motion picture film, which images may be scanned, in succession, by any of the several methods of scanning well known in the television art, to produce a train of television signals.

Most modern projectors, due to sound track requirements, are designed to shift the film intermittently at the rate of twenty four picture frames per second and allow, in these intervals, for equal periods of exposure and concealment of the film; i. e., each picture frame will be uncovered by the projector shutter, to permit passage of the light beam, for one forty-eighth of a second, and for a similar period will be covered by the shutter during shifting of the film to allow movement of the succeeding picture frame into registry with the light beam. It will be seen, therefore that in televising a single image, a complete scansion thereof must occur within that fraction of a second comprising the stationary period. This means that, in order to produce a television image possessing the number of picture elements of a size necessary to bring out the fine detail of the image, the length of time that each element of the image is exposed to the scanning means is exceedingly short, due to the speed at which the scanning means must travel in order to cover the exposed image in the allotted time. The overall time of a complete film cycle cannot be changed, due to the sound requirement of a ninety feet per minute rate of progression.

I have found that, without material alteration, the standard motion picture projector can be made to increase the time available for scansion without changing the existing ratio between the intervals of movement and rest of the film, and that the time between scansions may be decreased accordingly. This is accomplished by providing a shutter, including a prism of material permeable to light in one dimension and rotatable in synchronism with the movement of the film. This prism operates during the portions of time when the film is moving to refract the light beam and displace a portion of the projected image with respect to the picture on the film so that it is in position to be scanned before the film comes to rest in the light beam, and similarly to maintain a portion of the image in position when the film again starts to move. This means that scansion of the image may start before the film comes to rest and may continue after the film has started to move to bring the next succeeding picture frame into registry with the light beam.

In greater detail, the apparatus shown in Figure 1 represents apparatus, including one preferred form of the shutter of my invention, which may be used to transmit motion pictures by television. The film 2, depicting the action to be transmitted, is moved, by the intermittent sprocket 3, in the usual successive increments past the aperture 4, formed in a plate 5, which defines the light beam 6 emanating from the source 7 and passing through the condensing lens 8. An objective lens system 9 is provided in the path of the light beam for focusing the beam before suitable scanning apparatus.

While any of the several known types of electrical or mechanical scanning devices may be used in the practice of my invention, I prefer to use a device similar to the image dissector tube shown and described in the application of Robert E. Rutherford, entitled Image dissector and method of electron beam analysis, Serial No. 696,999, filed November 7, 1933; or I may prefer to use a variant tube shown and described in United States Patent No. 1,773,980, entitled Television system, issued to me on August 26, 1930.

Broadly, the latter tube comprises an evacuated envelope having a transparent end portion.

A photosensitive cathode is disposed at one end of the envelope, and a metallic screen anode structure including a sleeve having an aperture therein, behind which is positioned a target electrode, is located at the other end of the tube opposite the cathode. An optical image focused on the photosensitive cathode will institute an electron flow therefrom having elemental cross sectional densities corresponding to the light intensities of elemental portions of the optical image. By providing the anode structure with a charge positive with respect to the cathode, a uniform electrostatic field is established between the electrodes which causes the electrons emanating from the cathode surface to be maintained in their original relationships and to be accelerated in a defined beam in the direction of the anode. This beam is now acted upon by the magnetic fields of deflecting coils, energized by oscillators adjusted to suitable frequencies, which cause the beam to be deflected cyclically in two directions before the anode aperture. Successive elemental portions of the electrons in the beam will be admitted to the target electrode, and since the density of the electrons of the entering portion of the beam is proportional to the degree of light intensity of that portion of the optical image, at the cathode, from which the electrons originated, these successively collected electrons may be passed through an amplifier and thence to a radio or line system for transmission as a train of television signals.

The Rutherford tube is shown diagrammatically in Figure 1, and differs from the tube just described only in operation and in that the screen element of the anode structure has been dispensed with. Substantially the same envelope 11 is used having a transparent window 12 in the end thereof and a photosensitive cathode 13 positioned at the other end thereof. The anode structure comprising the tubular finger 14, provided with an aperture 16, projects into the tube from the side wall thereof with the aperture 16 facing the cathode. A target electrode 17 is positioned within the finger 14 and behind the aperture.

Since the electrostatic field between anode and cathode is asymmetrical, the electrons leaving the surface of the cathode 13 will not, as was the case in my tube described previously, be accelerated toward the anode in a beam having elemental cross sectional densities corresponding to the light intensities of the areas of the cathode from which they originated, but will tend to follow random paths. However, by the addition of magnetic focusing means, not shown, but comprising a solenoid coil disposed about the axis of the tube, and energized from a source of direct current, a constant intensity magnetic field is established parallel with the axis of the tube so that the electrons are caused to follow substantially helical paths and may be made, by correct adjustment of the various fields, to arrive, in the area of the anode aperture, in the same numerical relationship in which they left the cathode. It will be understood, however, that by deflecting this beam cyclically before the aperture, by means of deflection coils 18 and 19, driven by suitable oscillators 21 and 22 respectively, to permit collection by the target electrode, of elemental portions thereof, a train of television signals will be produced which may be conducted by the lead 23 to amplifying apparatus mission. This method of operation is fully discussed in the application referred to above.

In each of these tubes the amplitude of the signals depends on the intensity of illumination of the image at the cathode, this intensity governing the density of electron flow, and the interval of time in which the electrons from a given elemental area of the cathode are allowed to pass through the anode aperture. Since, due to the necessity of maintaining the rate of film movement at twenty four picture frames per second, the time per scansion usually being limited to one forty-eighth of a second, it will be seen that, due to the speed at which the beam sweeps past the aperture, only a small time factor is available for the collection of electrons from any one elemental area. As a result of this the amplitude of the signal output of the tube is relatively low. To increase the signal strength the natural tendency would be to decrease the frequency of deflection so as to permit a greater electron admittance to the target electrode. This means a considerable reduction in the number of picture elements and consequently a loss in detail of the reproduced image.

I have found that it is possible, while maintaining the standard rate of film movement, to increase the scansion time of each frame and correspondingly reduce the period of darkness between scansions thereof, this being due, in part, to a modification of the wave form of the low frequency oscillator, these two factors effecting a considerable gain in signal output strength and in the number of picture elements obtainable during each scansion.

This is accomplished by providing a gear 27 which is fixed on the shaft carrying the intermittent sprocket 3, which gear is in mesh, through an idler gear 28, with a pinion 29. The pinion is rotatable on a shaft 31, whose longitudinal axis lies in a plane transverse to the central axis of the light beam C, and is connected for rotation with a tubular shutter frame 32, rectangular in cross section. A prism 33 of light pervious material, preferably glass, is cemented or otherwise secured in the shutter frame. The gear ratio between the intermittent sprocket shaft and the shaft 31 is such that the shutter frame will make one half revolution for each quarter revolution of the sprocket; in other words, the shutter will make one half revolution during the shifting of each successive picture frame of the film 2.

Referring now to the diagrams shown in Figures 2 to 5 inclusive, we find that, in Figure 2, the positions of the elements are the same as in Figure 1, which position they occupy during each exposure of the film. The film in these diagrams is indicated by a series of joined arrows, the distance between the points thereof representing the length of each picture frame. The light beam 6 has been shown as comprising four parallel zones which will be useful in describing the operation of the shutter and prism to be explained directly. The objective lens system 9, of Figure 1, has been replaced, in the diagrams, with an apertured plate 34, similar to the plate 5, so that the deflection of the light beam may be more readily understood.

In Figure 3 the film has started to move downwardly, to bring a new picture frame into position before the aperture 4, and the shutter has rotated so that the leading edge of the upper portion of the frame thereof has advanced into registry with the receding edge of the previously exposed picture frame. As the prism rotated, from the position shown in Figure 2 to that shown in Figure 3, the angle of the prism faces, with respect to the axis of the beam, progressively changed with the result that the beam was refracted in passing through the prism an amount corresponding to the distance that the picture frame had been displaced with respect to the aperture 4. This progressively increasing refraction of the beam maintained the optical image in the same relationship with the aperture in the plate 34 as existed when the film frame was positioned directly before the aperture 4. Further movement of the film and consequently rotation of the shutter frame will cause the light beam to be cut off, as shown in Figure 4; and continued movement of the elements will create a condition which is shown in Figure 5; this being the reverse of what occurred during movement of the shutter frame to the position shown in Figure 3, in that the leading edge of the next succeeding picture frame of the film has been refracted so that that portion of the picture exposed through the prism is already alined with the aperture in the plate 34 even though the picture frame has not yet moved into alinement with the aperture 4. It will be readily seen by examination of the diagrams that exactly a fifty percent increase in the exposure time of each picture frame is obtained between the cut off of the image, as shown in Figure 3, and the start of exposure of the image, as shown in Figure 5. It will also be seen that a reduction of like percentage is obtained in the dark period between exposures of successive picture frames of the film.

While it is admitted that the shutter of my invention would not function efficiently in the projection of motion pictures for visual entertainment purposes, due to the nonuniformity of exposure of different areas of the image occasioned by the spaced relationship, within the confines of the projected image, of the points of inception and cut off of the light beam, I am not concerned with this phase of operation, the object to be attained being the extension of the scansion time of each picture frame to the maximum obtainable during the interval of time that the frame is moved into and out of registry with the light beam. Thus, as long as complete exposure of the area covered by the optical image starts at one edge thereof, and progresses toward the other edge thereof in advance of the elemental area under scansion, there is no need of further continuing exposure of the parts of the image already scanned. As a result of this it will be seen that the fadeout of the image may follow directly in the wake of the elemental area being scanned, the final result being that, since the scanning means traversed only those areas of the image under full exposure, the resulting train of television signals is capable of reproducing a complete image having a uniform degree of brilliance.

The desirability of increased scansion time in the operation of television transmitting tubes has been stated above, and I utilize the gain in scansion time to provide for greater amplitude of the output of these tubes due to the extended time of exposure of the film, obtained with the shutter of my invention, to produce televised motion pictures of increased brilliance and fineness of detail. It can be easily understood that by modifying the saw-tooth wave form of the oscillator 21 to provide for a longer interval of time during the working half cycle, and a corresponding shortening of the return half cycle, a material increase will be obtained in the time available for the scansion of the complete image. Consequently it is possible to transmit a televised picture containing a greatly increased number of picture elements per scansion, or the same number of picture elements with greatly increased signal strength.

The shutter of my invention lends itself well to the system of interlaced scanning. This system is rapidly finding favor with the television research worker, and consists, broadly, in the systems using cathode ray tubes, of adding a secondary pulse to the low frequency deflecting coils so that, for example, where it is desired to scan an object with a certain number of lines, only every other line is traversed during one cycle, or deflection, of the scanning beam, the secondary pulse causing a deflection of the scanned area during the second cycle, to cause the scansion of lines which were not scanned during the first cycle. Although the complete image is scanned but once, the beam has covered the image field twice. It will be seen that since the interval of time in which the image is maintained in a stationary position, when using the shutter above described, is materially extended over that which obtained heretofore, ample time is afforded, by the use of the apparatus of my invention, in which the image may be scanned a greater number of times than was possible with other mechanisms. Superior results and finer detail in the reproduced image have been obtained by the use of this system. It will be understood that the image may be scanned any number of times, this being governed by the secondary pulse, the reference to double scansion above being exemplary.

The improved shutter just described is characterized by simplicity, ease of construction, ready applicability to existing motion picture projectors for the uses described above, and marks a distinct advancement in the television art.

I claim:

1. The combination, with apparatus for the transmission of televised motion pictures of a focused light source, means for guiding a motion picture film before said light source in registry with said television transmission apparatus, driving means positioned to draw said film intermittently past said light source, and arranged to maintain each film frame stationary in registry with said light source and said television transmission apparatus, for a definite period of time, and to draw successive film frames into such registry during equal periods of time, and means for maintaining the visual image exposed to the scanning means in a stationary position during movement of the film.

2. The combination, with apparatus for the transmission of televised motion pictures of a focused light source, means for guiding a motion picture film before said light source in registry with said television transmission apparatus, intermittent-driving means positioned and arranged to draw said film past said light source, to maintain successive frames of said film in registry with said light source for fixed periods of time and to utilize equal periods of time to shift successive film frames into registry with said light source, and optical means for refracting said beam during movement of the film to maintain said image in stationary relationship with said scanning means.

3. The combination, with apparatus for the transmission of televised motion pictures having a scanning device, a light source, a film guide positioned opposite said source, driving means so sitioned and arranged as to draw film to be vised over said guide into registry with said source and said scanning device, and to main each frame of said film in such registry f certain period of time, and to displace said during an equal interval of time to bring the successive frame into such registry, of means maintaining the visual image projected on scanning means in a stationary position duri portion of the movement of the film, and me for cutting off the beam of light during anot portion of the movement of the film.

4. The combination, with apparatus for transmission of televised motion pictures hav a scanning device, of a light beam source, a guide positioned opposite said source and in re try with said light beam, intermittent-driv means so positioned and arranged as to draw s cessive frames of the film to be televised over s guide into registry with said light beam and s scanning means, to maintain each frame in st registry for a definite period of time, and to m successive frames into such registry during int mediate equal periods of time, of means for p jecting a portion of the visual image of each said frames into a stationary position on s scanning means prior to and beyond the inter of time when the film dwells in the light beam.

5. The combination, with apparatus for t transmission of televised motion pictures havi scanning means, a light beam source and an i terposed film guide aligned with said light bea source, intermittent driving means so position and arranged as to draw motion picture film to televised over said guide into registry with sa light beam and said scanning means, to hold ea frame of said film in such registry for a defini interval of time, and to displace said film durir an equal interval of time to draw the next succec ing frame of said film into said registry, of optic means interposed between said film and said scar ning means for refracting said beam an amour related to the degree of movement of the film s that the projected image is maintained in sta tionary relationship with the scanning means dur ing movement of the film.

6. The combination, with apparatus for th transmission of televised motion pictures havin scanning means, a light beam source and an in terposed film guide aligned with said light bean source, intermittent driving means so positione and arranged as to draw motion picture film to be televised over said guide into registry with said light beam and said scanning means, to hold each frame of said film in such registry for a definite interval of time, and to displace said film during an equal interval of time to draw the next succeeding frame of said film into said registry, of a shutter comprising a rectangular prism of light permeable material rotatably mounted in the path of said beam and synchronized with the movement of the film, for effecting, during movement of the film, a gradual displacement between the image on the film and the projected image before the scanning means.

7. The combination, with apparatus for the transmission of televised motion pictures having scanning means, a light beam source and an interposed film guide aligned with said light beam source, intermittent driving means so positioned and arranged as to draw motion picture film to be televised over said guide into registry with said light beam and said scanning means, to hold each interval of time, and to displace said film during an equal interval of time to draw the next succeeding frame of said film into said registry, of a shutter comprising a tubular rectangular frame mounted for rotation in a plane transverse to the longitudinal axis of the beam, and optical means mounted on said frame for refracting said beam during movement of the film for maintaining the position of the projected image in a stationary position before the scanning means during movement of the film.

8. The combination, with apparatus for the transmission of televised motion pictures having scanning means, a light beam source and an interposed film guide aligned with said light beam source, intermittent driving means so positioned and arranged as to draw motion picture film to be televised over said guide into registry with said light beam and said scanning means, to hold each frame of said film in such registry for a definite interval of time, and to displace said film during an equal interval of time to draw the next succeeding frame of said film into said registry, of a shutter comprising a tubular rectangular frame mounted for rotation in a plane transverse to the longitudinal axis of the beam, and sychronized with the movement of the film, and a prism of light permeable material mounted on said frame for refracting said beam during movement of the film for maintaining the position of the projected image in a stationary position before the scanning means during movement of the film.

9. The combination, with apparatus for the transmission of televised motion pictures having scanning means, a light beam source and an interposed film guide aligned with said light beam source, intermittent driving means so positioned and arranged as to draw motion picture film to be televised over said guide into registry with said light beam and said scanning means, to hold each frame of said film in such registry for a definite interval of time, and to displace said film during an equal interval of time to draw the next succeeding frame of said film into said registry, of a shutter comprising a tubular rectangular frame mounted for rotation in a plane transverse to the longitudinal axis of the beam, and rotatable at a peripheral speed in excess of the speed of movement of the film, and a rectangular prism of light permeable material having the sides thereof parallel to the axis of rotation thereof mounted on said frame for refracting said beam during movement of the film for maintaining the position of the projected image in a stationary position before the scanning means during movement of the film.

10. The combination, with an image dissector tube for use in a television transmitter having a photosensitive cathode capable of emitting an electron discharge having elemental cross sectional densities corresponding to the light intensities of elemental areas of an optical image projected thereon, means for accelerating said discharge in an electrostatic field to produce a beam of cathode rays, and means for deflecting said beam cyclically in two directions past an electron collecting electrode so that successive elemental portions of the beam will be collected by the electrode to produce a train of television signals, of means for projecting an optical image on said cathode from images fixed on a motion picture film, said means comprising a light beam source directed toward said cathode, a film guide interposed between said cathode and said light source, intermittent driving means so positioned and arranged as to draw said film to be televised over said guide, to hold each film frame in such registry with said light beam that the projected image of said frame will fall upon said cathode for a definite interval of time, to draw the next successive frame of said film into such registry during an equal interval of time, and optical means for maintaining the projected image of each frame in a stationary position on said cathode during movement of said film.

11. The combination, with an image dissector tube for use in a television transmitter having a photosensitive cathode capable of emitting an electron discharge having elemental cross sectional densities corresponding to the light intensities of elemental areas of an optical image projected thereon, means for accelerating said discharge in an electrostatic field to produce a beam of cathode rays, and means for deflecting said beam cyclically in two directions past an electron collecting electrode so that successive elemental portions of the beam will be collected by the electrode to produce a train of television signals, of means for projecting an optical image on said cathode from images contained on a motion picture film, said means comprising a light beam source directed toward said cathode, a film guide interposed between said cathode and said light source, intermittent driving means so positioned and arranged as to draw said film to be televised over said guide, to hold each film frame in such registry with said light beam that the projected image of said frame will fall upon said cathode for a definite interval of time, to draw the next successive frame of said film into such registry during an equal interval of time, and optical means for maintaining the projected image of each frame in a stationary position on said cathode during movement of said film.

12. The combination, with an image dissector tube for use in a television transmitter having a photosensitive cathode capable of emitting an electron discharge having elemental crosssectional densities corresponding to the light intensities of elemental areas of an optical image projected thereon, means for accelerating said discharge in an electrostatic field to produce a beam of cathode rays, and means for deflecting said beam cyclically in two directions past an electron collecting electrode so that successive elemental portions of the beam will be collected by the electrode to produce a train of television signals, of means for projecting an optical image on said cathode from images contained on a motion picture film which is movable in successive increments through a beam of light projected on said cathode, said means comprising a light beam source directed toward said cathode, a film guide interposed between said cathode and said light source, intermittent driving means so positioned and arranged as to draw said film to be televised over said guide, to hold each film frame in such registry with said light beam that the projected image of said frame will fall upon said cathode for a definite interval of time, to draw the next successive frame of said film into such registry during an equal interval of time, and optical means for maintaining the projected image of each frame in a stationary position on said cathode during movement of said film, said means comprising a prism of light-pervious material rotatably mounted in the path of said light beam, so positioned and arranged as to maintain said projected image in a stationary position on said cathode.

13. The combination, with an image dissector tube for use in a television transmitter having a photosensitive cathode capable of emitting an electron discharge having elemental cross sectional densities corresponding to the light intensities of elemental areas of an optical image projected thereon, means for accelerating said discharge in an electrostatic field to provide a beam of cathode rays, and means for deflecting said beam cyclically in two directions past an electron collecting electrode so that successive elemental portions of the beam will be collected by the electrode to produce a train of television signals, of means for projecting an optical image on said cathode from images contained on a motion picture film, said means comprising a light beam source directed toward said cathode, a film guide interposed between said cathode and said light source, intermittent driving means so positioned and arranged as to draw said film to be televised over said guide, to hold each film frame in such registry with said light beam that the projected image of said frame will fall upon said cathode for a definite interval of time, to draw the next successive frame of said film into such registry during an equal interval of time, and means for maintaining the projected image of each frame in a stationary position on said cathode during movement of said film, comprising a tubular opaque frame mounted for rotation in a plane transverse to the longitudinal axis of the beam, for interrupting said beam during portions of the rotation of the frame and movement of the film, and a prism of light permeable material mounted in said frame for refracting said light beam during the time when said beam is not interrupted, to refract said beam to maintain said projected image from the film in a stationary position on said cathode during movement of the film.

14. In television, the method of scanning motion picture images projected to have a stationary period and a moving period which comprises starting scansion before an individual picture comes to rest, compensating for picture motion by progressive refraction, continuing scansion during the stationary period, continuing scansion after the picture starts to move, and again compensating for picture motion by progressive refraction until scansion is finished, thereby lengthening the time available for scansion.

15. In television, the method of scanning motion picture images projected to have a stationary period and a moving period which comprises scanning throughout the stationary period, additionally scanning at the beginning and end of the moving period and compensating for the motion of the film during said portions of the moving period by progressive refraction.

PHILO T. FARNSWORTH.